United States Patent
Chanda et al.

(10) Patent No.: US 12,002,291 B2
(45) Date of Patent: Jun. 4, 2024

(54) METHOD AND SYSTEM FOR CONFIDENCE LEVEL DETECTION FROM EYE FEATURES

(71) Applicant: Tata Consultancy Services Limited, Mumbai (IN)

(72) Inventors: Sushovan Chanda, Pune (IN); Gauri Deshpande, Pune (IN); Sachin Patel, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 463 days.

(21) Appl. No.: 17/453,634

(22) Filed: Nov. 4, 2021

(65) Prior Publication Data

US 2023/0018693 A1    Jan. 19, 2023

(30) Foreign Application Priority Data

Jun. 4, 2021 (IN) .............................. 202121024975

(51) Int. Cl.
    *G06K 9/00* (2022.01)
    *G06F 18/214* (2023.01)
    (Continued)

(52) U.S. Cl.
    CPC ............ *G06V 40/20* (2022.01); *G06F 18/214* (2023.01); *G06N 3/08* (2013.01); *G06T 7/73* (2017.01);
    (Continued)

(58) Field of Classification Search
    CPC ........ G06V 40/20; G06V 10/95; G06V 20/46; G06V 40/171; G06V 10/25; G06V 10/457;
    (Continued)

(56) References Cited

U.S. PATENT DOCUMENTS

| 10,571,925 B1 * | 2/2020 | Zhang ................. G05D 1/0246 |
| 11,232,294 B1 * | 1/2022 | Banerjee ................ G06T 7/246 |

(Continued)

FOREIGN PATENT DOCUMENTS

| CN | 111782838 A | * 10/2020 | ............... G06K 9/00 |
| CN | 111782840 A | * 8/2023 | ....... G06F 16/90332 |

(Continued)

OTHER PUBLICATIONS

Jim Smith et al., "Predicting User Confidence During Visual Decision Making," ACM Transactions on Interactive Intelligent Systems, Jun. 2018, vol. 8, Issue: 2, ACM, https://uwe-repository.worktribe.com/preview/867452/Predicting%20User%27s%20Confidence%20During%20Visual%20Decision%20Making-%20repository%20version.pdf.

(Continued)

*Primary Examiner* — Jerome Grant, II
(74) *Attorney, Agent, or Firm* — FINNEGAN, HENDERSON, FARABOW, GARRETT & DUNNER, LLP

(57) ABSTRACT

State of art techniques attempt in extracting insights from eye features, specifically pupil with focus on behavioral analysis than on confidence level detection. Embodiments of the present disclosure provide a method and system for confidence level detection from eye features using ML based approach. The method enables generating overall confidence level label based on the subject's performance during an interaction, wherein the interaction that is analyzed is captured as a video sequence focusing on face of the subject. For each frame facial features comprising an Eye-Aspect ratio, a mouth movement, Horizontal displacements, Vertical displacements, Horizontal Squeezes and Vertical Peaks, are computed, wherein HDs, VDs, HSs and VPs are features that are derived from points on eyebrow with reference to (Continued)

nose tip of the detected face. This is repeated for all frames in the window. A Bi-LSTM model is trained using the facial features to derive confidence level of the subject.

12 Claims, 8 Drawing Sheets

(51) Int. Cl.
*G06N 3/08* (2023.01)
*G06T 7/73* (2017.01)
*G06V 10/94* (2022.01)
*G06V 20/40* (2022.01)
*G06V 40/16* (2022.01)
*G06V 40/20* (2022.01)

(52) U.S. Cl.
CPC .............. *G06V 10/95* (2022.01); *G06V 20/46* (2022.01); *G06V 40/171* (2022.01); *G06T 2207/10016* (2013.01); *G06T 2207/20081* (2013.01); *G06T 2207/20084* (2013.01); *G06T 2207/30201* (2013.01)

(58) Field of Classification Search
CPC .... G06V 10/62; G06V 10/751; G06V 10/757; G06V 10/761; G06V 10/768; G06V 10/82; G06V 40/165; G06V 40/174; G06V 40/193; G06F 18/214; G06N 3/08; G06T 7/73; G06T 2207/10016; G06T 2207/20081; G06T 2207/20084; G06T 2207/30201
USPC ......................................................... 382/103
See application file for complete search history.

(56) References Cited

U.S. PATENT DOCUMENTS

| | | | |
|---|---|---|---|
| 2010/0266213 A1 | 10/2010 | Hill | |
| 2021/0201115 A1* | 7/2021 | Laszlo | ............ G06V 30/18057 |

FOREIGN PATENT DOCUMENTS

| | | | |
|---|---|---|---|
| EP | 3109798 | 12/2016 | |
| WO | WO2019223421 | * 11/2019 | ............ G06T 11/00 |

OTHER PUBLICATIONS

Ailsa E. Millen et al., "Eye spy a liar: assessing the utility of eye fixations and confidence judgments for detecting concealed recognition of faces, scenes and objects," Cognitive Research: Principles and Implications, Aug. 2020, Springer, https://cognitiveresearchjournal.springeropen.com/track/pdf/10.1186/s41235-020-00227-4.pdf.

* cited by examiner (High confidence)

(low confidence)

(Low confidence)

(Medium confidence)

(Medium confidence)

(high confidence)

(low confidence)

METHOD AND SYSTEM FOR CONFIDENCE LEVEL DETECTION FROM EYE FEATURES

PRIORITY CLAIM

This U.S. patent application claims priority under 35 U.S.C. § 119 to: Indian patent application no. 202121024975, filed on Jun. 4, 2021. The entire contents of the aforementioned application are incorporated herein by reference.

TECHNICAL FIELD

The embodiments herein generally relate to automated confidence level detection and, more particularly, to a method and system for confidence level detection from eye features using Machine Learning (ML) based approach.

BACKGROUND

Machine learning based facial feature analysis to derive various behavioural insights is a well-researched topic. A person's confidence is very important in developing his/her attitude and communication skills. Existing arts propose methods using acoustic and facial features to identify behaviour parameters like Emotions, Stress detections etc. Also, eye pupils and body temperature for stress detection have been used, but none of them attempt confidence level detection.

SUMMARY

Embodiments of the present disclosure present technological improvements as solutions to one or more of the above-mentioned technical problems recognized by the inventors in conventional systems.

For example, in one embodiment, a method for confidence level detection from eye features using Machine Learning (ML) based approach is provided. The method includes querying a plurality of subjects with a predefined set of question. Further, capturing a plurality of video sequences corresponding to the plurality of subjects while the plurality of subjects respond to the predefined set of questions, wherein each video sequence among the plurality of video sequences captures a face of corresponding subject from the plurality of subjects at predefined frames per second (FPS). Furthermore, extracting a plurality of face features for each of the plurality of video sequences, wherein the plurality of face features comprise an Eye-Aspect ratio (EAR), a mouth movement, Horizontal displacements (HDs), Vertical displacements (VDs), Horizontal Squeezes (HSs) and Vertical Peaks (VPs). The HDs computation for each of the video sequence comprises: identifying nose tip coordinates from the face in every frame of a video sequence among the plurality of video sequences; identifying eyebrow start coordinates and eyebrow end coordinates for eyebrows of the face in every frame with respect to the nose tip coordinates; and computing a plurality of HD values by determining a Euclidean distance between the eyebrow start coordinates and the eyebrow end coordinates of each of the eyebrows for a current frame and a previous frame of the video sequence, for all the frames in the video sequence.

The, VDs computation for each of the video sequence comprises determining, for each of the eyebrows, a first highest point of a first eyebrow and a second highest point of a second eyebrow in vertical direction with respect to the identified nose tip coordinates in every frame; determining a highest vertical point for each frame by computing statistical mean of the first highest point and the second highest point; and computing a plurality of VD values by determining the Euclidean distance between the highest vertical point of the current frame and the previous frame of the video sequence, for all the frames in the video sequence.

The HSs computation for each of the video sequence comprises: identifying a HD threshold value by computing a statistical mean of the plurality of HD values; selecting a first subset of values from the plurality of HD values that are above the HD threshold value representing a plurality of HS values; and determining a horizontal count corresponding to number of the plurality of HS values appearing per second.

The VPs computation for each of the video sequence comprises: identifying a VD threshold value by computing a statistical mean of the plurality of VD; selecting a second subset of values from the plurality of VD values that are above the VD threshold value as a plurality of VP values; and determining a vertical count corresponding to number of the plurality of VP values appearing per second.

Furthermore, the method comprises training a Neural Network (NN) model, using the extracted plurality of face features from the plurality of video sequences to predict a confidence level of the subject as one among a plurality of confidence levels. Thereafter, the method comprises predicting confidence level of an test subject utilizing the trained NN model executed by the one or more hardware processors, wherein the trained NN model predicts the confidence level by analyzing extracted face features from the test video sequence captured when the test subject is queried with a set of unknown questions.

In another aspect, a system for confidence level detection from eye features using Machine Learning (ML) based approach is provided. The system comprises a memory storing instructions; one or more Input/Output (I/O) interfaces; and one or more hardware processors coupled to the memory via the one or more I/O interfaces, wherein the one or more hardware processors are configured by the instructions to query a plurality of subjects with a predefined set of question. Further, capture a plurality of video sequences corresponding to the plurality of subjects while the plurality of subjects respond to the predefined set of questions, wherein each video sequence among the plurality of video sequences captures a face of corresponding subject from each of the plurality of subjects at predefined frames per second (FPS). Furthermore, extract a plurality of face features for each of the plurality of video sequences, wherein the plurality of face features comprise an Eye-Aspect ratio (EAR), a mouth movement, Horizontal displacements (HDs), Vertical displacements (VDs), Horizontal Squeezes (HSs) and Vertical Peaks (VPs). The HDs computation for each of the video sequence comprises: identifying nose tip coordinates from the face in every frame of a video sequence among the plurality of video sequences; identifying eyebrow start coordinates and eyebrow end coordinates for eyebrows of the face in every frame with respect to the nose tip coordinates; and computing a plurality of HD values by determining a Euclidean distance between the eyebrow start coordinates and the eyebrow end coordinates of each of the eyebrows for a current frame and a previous frame of the video sequence, for all the frames in the video sequence.

The, VDs computation for each of the video sequence comprises determining, for each of the eyebrows, a first highest point of a first eyebrow and a second highest point of a second eyebrow in vertical direction with respect to the identified nose tip coordinates in every frame; determining a highest vertical point for each frame by computing statistical mean of the first highest point and the second highest point; and computing a plurality of VD values by determining the Euclidean distance between the highest vertical point of the current frame and the previous frame of the video sequence, for all the frames in the video sequence.

The HSs computation for each of the video sequence comprises: identifying a HD threshold value by computing a statistical mean of the plurality of HD values; selecting a first subset of values from the plurality of HD values that are above the HD threshold value representing a plurality of HS values; and determining a horizontal count corresponding to number of the plurality of HS values appearing per second.

The VPs computation for each of the video sequence comprises: identifying a VD threshold value by computing a statistical mean of the plurality of VD; selecting a second subset of values from the plurality of VD values that are above the VD threshold value as a plurality of VP values; and determining a vertical count corresponding to number of the plurality of VP values appearing per second.

Furthermore, train a Neural Network (NN) model, using the extracted plurality of face features from the plurality of video sequences to predict a confidence level of the subject into one among a plurality of confidence levels. Thereafter, the predict the confidence level of an test subject utilizing the trained NN model executed by the one or more hardware processors, wherein the trained NN model predicts the confidence level by analyzing extracted face features from the test video sequence captured when the test subject is queried with a set of unknown questions.

In yet another aspect, there are provided one or more non-transitory machine-readable information storage mediums comprising one or more instructions, which when executed by one or more hardware processors causes a method for confidence level detection from eye features using Machine Learning (ML) based approach. The method includes querying a plurality of subjects with a predefined set of question. Further, capturing a plurality of video sequences corresponding to the plurality of subjects while the plurality of subjects respond to the predefined set of questions, wherein each video sequence among the plurality of video sequences captures a face of corresponding subject from the plurality of subjects at predefined frames per second (FPS). Furthermore, extracting a plurality of face features for each of the plurality of video sequences, wherein the plurality of face features comprise an Eye-Aspect ratio (EAR), a mouth movement, Horizontal displacements (HDs), Vertical displacements (VDs), Horizontal Squeezes (HSs) and Vertical Peaks (VPs). The HDs computation for each of the video sequence comprises: identifying nose tip coordinates from the face in every frame of a video sequence among the plurality of video sequences; identifying eyebrow start coordinates and eyebrow end coordinates for eyebrows of the face in every frame with respect to the nose tip coordinates; and computing a plurality of HD values by determining a Euclidean distance between the eyebrow start coordinates and the eyebrow end coordinates of each of the eyebrows for a current frame and a previous frame of the video sequence, for all the frames in the video sequence.

The, VDs computation for each of the video sequence comprises determining, for each of the eyebrows, a first highest point of a first eyebrow and a second highest point of a second eyebrow in vertical direction with respect to the identified nose tip coordinates in every frame; determining a highest vertical point for each frame by computing statistical mean of the first highest point and the second highest point; and computing a plurality of VD values by determining the Euclidean distance between the highest vertical point of the current frame and the previous frame of the video sequence, for all the frames in the video sequence.

The HSs computation for each of the video sequence comprises: identifying a HD threshold value by computing a statistical mean of the plurality of HD values; selecting a first subset of values from the plurality of HD values that are above the HD threshold value representing a plurality of HS values; and determining a horizontal count corresponding to number of the plurality of HS values appearing per second.

The VPs computation for each of the video sequence comprises: identifying a VD threshold value by computing a statistical mean of the plurality of VD; selecting a second subset of values from the plurality of VD values that are above the VD threshold value as a plurality of VP values; and determining a vertical count corresponding to number of the plurality of VP values appearing per second.

Furthermore, the method comprises training a Neural Network (NN) model, using the extracted plurality of face features from the plurality of video sequences to predict a confidence level of the subject as one among a plurality of confidence levels. Thereafter, the method comprises predicting confidence level of an test subject utilizing the trained NN model executed by the one or more hardware processors, wherein the trained NN model predicts the confidence level by analyzing extracted face features from the test video sequence captured when the test subject is queried with a set of unknown questions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
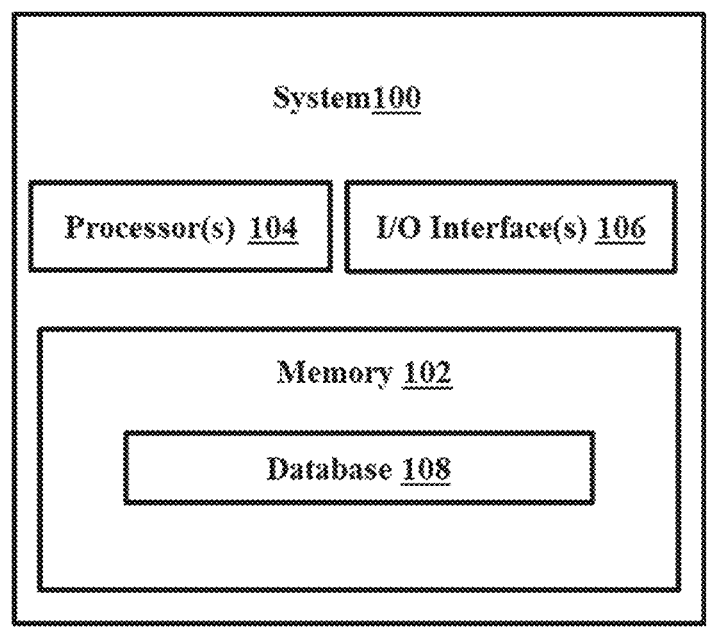
FIG. 1 is a functional block diagram of a system for confidence level detection from eye features, using Machine Learning (ML) based approach, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Confidence level detection is a critical parameter in the automated interview processes or applications demanding automated behavioral analysis of a subject being monitored and analyzed. Embodiments of the present disclosure provide a method and system for confidence level detection from eye features using Machine Learning (ML) based approach. The method enables generating an overall confidence level label based on the subject's performance during the interaction, wherein the interaction that is analyzed is captured as a video sequence focusing on face of the subject. For each frame in the video sequence, the face is detected and standard feature points such as eyes, nose tip, mouth etc. are detected using known techniques such as Multi-Task Cascaded Convolutional Neural Networks (MTCNN). From the feature points, an Eye-Aspect ratio (EAR), a mouth movement, Horizontal displacements (HDs), Vertical displacements (VDs), Horizontal Squeezes (HSs) and Vertical Peaks (VPs), are computed as facial features. The HDs, VDs, HSs, and VPs are features that are derived from points on eyebrow with reference to nose tip of the detected face. This is repeated for all frames in the window. A trained Neural Network Model comprising a Bidirectional Long Short Term Memory (Bi-LSTM) layer is trained using the facial features to derive confidence level of the subject. The HSs and VPs are obtained using time series analysis of HDs and VDs respectively across the multiple frames in the video sequence.

As mentioned, state of art techniques have attempted extracting insights from eye features, specifically pupil with focus on behavioral analysis than on confidence level detection. However, the unique eye features disclosed herein, specifically the HDs and VDs and HSs and VPs further derived from HDs and VDs respectively are critical parameters that enhance accuracy of confidence level prediction. Moreover, as stated by Baron Cohen and well known in art, eyelid and eyebrow expressions provide important non-verbal cues in human communication or judging one's statement for marking as true/false. Further, with the psychology perspective, it is also known that eyes could convey almost as much effective information as the whole face. So, it is quite natural that state of the art techniques focus on eyebrow and eyelid based features. However, the method disclosed herein enables detecting the facial actions and their intensity for a specific human behavior classification. In this sense, several facial expression classifiers have been reported by using Neural Networks, Gabor wavelets, Bayesian Networks etc. The average effectiveness of 36% has been reported while classifying human confidence using these approaches. The need for creating new facial features for classifying human confidence is quite visible in this area. Using the disclosed HD, VD, HS, and VP features, it is observed that the average effectiveness improves up-to 80%. Moreover, the method not only focuses on eyelid and eyebrow but also it takes another face component (i.e. nose) into action with some statistical measures, adding to accuracy improvement in case of angular movement of faces in input images of subjects.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a functional block diagram of a system, for confidence level detection from eye features using Machine Learning (ML) based approach, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores a) a predefined set of question used to query the subject being monitored for confidence level, b) a plurality of video sequences corresponding to the plurality of subjects while the plurality of subjects respond to the predefined set of questions, c) extracted plurality of face features from each of the plurality of video sequences, wherein the plurality of face features comprise a Eye-Aspect ratio (EAR), a mouth movement, Horizontal displacements (HDs), Vertical displacements (VDs), Horizontal Squeezes (HSs) and Vertical Peaks (VPs), and the like. Further, the memory 102 includes modules such as a NN model (not shown) that comprises a comprising a Bi-LSTM layer for ML based confidence level detection. Further, the database 108, may also store a training dataset of video sequences, from which the plurality of face features are derived to train the NN model for confidence level detection. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with FIG. 2 through FIG. 5.

Figure 2:
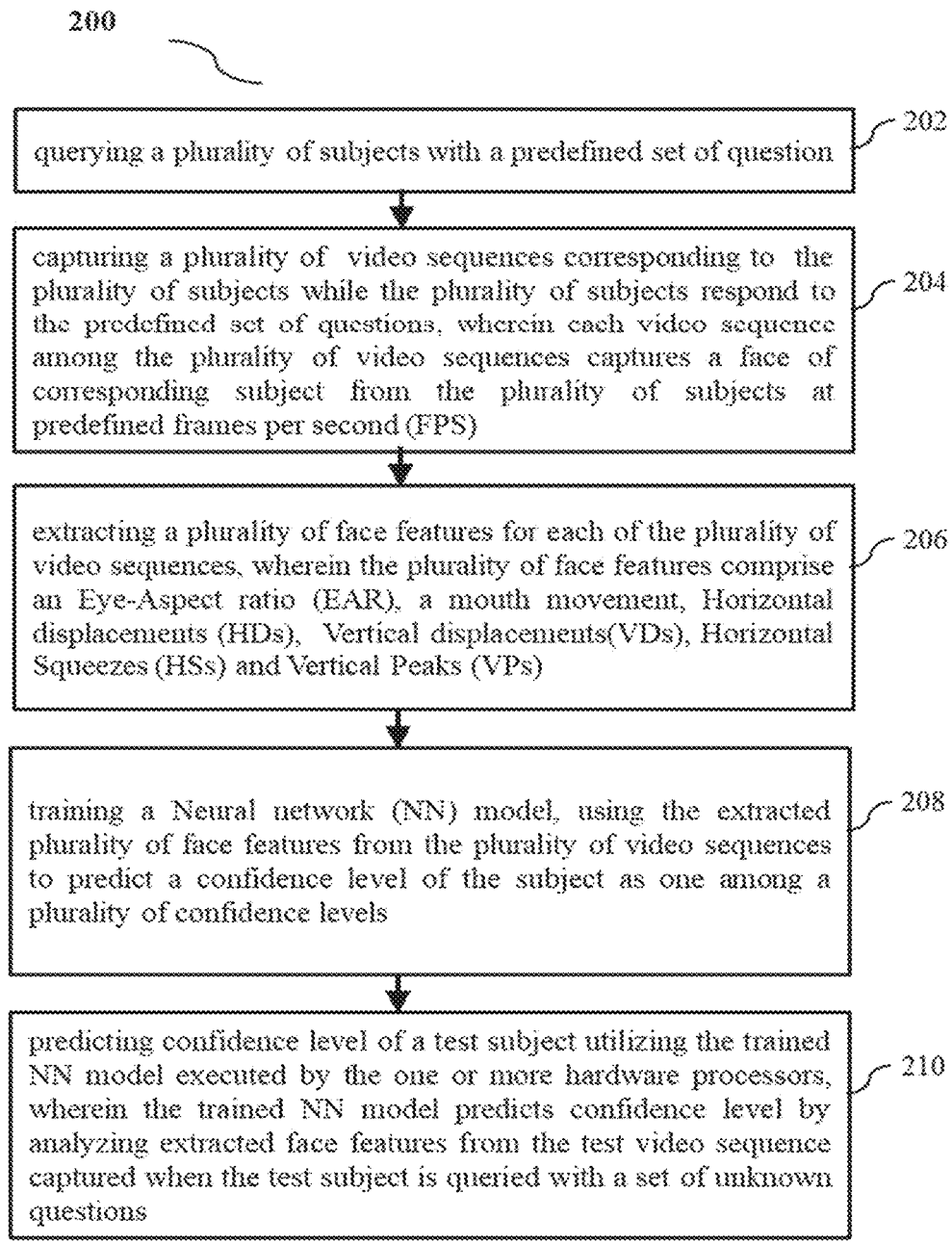
FIG. 2 is a flow diagram illustrating a method for confidence level detection from eye features using Machine Learning (ML) based approach, using the system of FIG. 1, in accordance with some embodiments of the present disclosure.

FIG. 2 is a flow diagram illustrating a method for confidence level detection from eye features using Machine Learning (ML) based approach, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, steps 202 through 208 refer to training phase of the NN model based on extraction of the plurality of face features from input video sequences for a plurality of subjects. Thus, at step 202 of the method 200, the one or more hardware processors 104 query the plurality of subjects with a predefined set of question. As proposed by Bridger et al. (2013), a cognitive ignition questionnaire is used to measure behavioral problems associated with stress and confidence. Following this approach, a self-administered questionnaire is created comprising of six questions. It is developed in such a format that the initial questions help in obtaining the medium confidence level of the participants. These questions are meant to make the candidate comfortable with the process. The next set of questions is made up of general questions with no specific right or wrong answer, but it requires a deep spontaneous thinking. One of the example questions is: "How will you sell ice cream in the local park on a rainy day?". To answer this question, participants require a special amount of cognitive thinking in a short time. Responses to these questions have enabled to capture the participants' facial and verbal expressions. The expressions while thinking and answering both are captured for obtaining the cues on low and high confidence levels. All the videos are captured with a framing rate of 30 fps. Thus, method constructs the questions based on study that enable to capture maximum variations in facial expressions indicative of variation in confidence level. Reference is derived from Bridger, R. S., Johnsen, S. A. K., and Brasher, K. (2013). Psychometric properties of the cognitive failures' questionnaire, Ergonomics 56, 1515-1524. An example question set is provided below:

Tell me about yourself
What is your favorite subject till date?
What was the tough decision that you have taken till date?
What will you do if zombie apocalypse happens?
How do you sell ice cream in a park in a rainy day?

Once the question are posed to the plurality of subjects, at step 204 of the method 200, the one or more hardware processors 104 capture a plurality of video sequences corresponding to the plurality of subjects while the plurality of subjects respond to the predefined set of questions. Each video sequence among the plurality of video sequences captures a face of a corresponding subject of the plurality of subjects at predefined frames per second (FPS). Example video sequences, which refer to an example training dataset, contain subjects' age ranging between 18 to 21 years with a balanced set of samples from both male and female participants. All the conversations are recorded in 'English' language. 20 college going subjects participated for video data collection. The protocol comprises of a questionnaire which the interviewer asked the participants via a Skype call. As it starts, a consent was taken from the participant for recording the audio-visual clip. Only when the participants give their consent for recording, the further process continues. The subjects were asked 5 questions, with an option to opt out at any point in time. All the videos (video sequences) are captured with a framing rate of 30 fps. It was made sure that the questions and the interaction were similar for each subject. Initially, the subjects were kept unaware about the reason behind the data-set collection to assure natural results. After the collection they were informed. The same protocol has been followed throughout.

At step 206 of the method 200, the one or more hardware processors 104 extract the plurality of face features from each of the plurality of video sequences, wherein the plurality of face features comprise the Eye-Aspect ratio (EAR), the mouth movement, the Horizontal displacements (HDs), the Vertical displacements (VDs), the Horizontal Squeezes (HSs) and the Vertical Peaks (VPs).

After capturing video sequences, images are extracted from those videos. Faces present in the frames (images) of the video sequence are detected using the known Multi-Task Cascaded Convolutional Neural Networks (MTCNN) and extracted regions (coordinates) of face such as eyes, nose, eyebrows, and lips are identified using Dlib™. Further, the plurality of face features, such as the known eye-aspect ratio (EAR), mouth movement are computed using known techniques, whereas the unique features such as the HDs and VDs are obtained as described below. Similarly, computation of the derived features HSs and VPs from the HDs and VDs respectively, based on time series analysis is described below. The facial features once extracted are then passed to the NN model.

The steps for HDs computation for each of the video sequence comprise:
 a) Identifying nose tip coordinates from the face in every frame of a video sequence among the plurality of video sequences.
 b) Identifying eyebrow start coordinates and eyebrow end coordinates for eyebrows of the face in every frame with respect to the nose tip coordinates.
 c) Computing a plurality of HD values by determining a Euclidean distance between the eyebrow start coordinates and the eyebrow end coordinates of each of the eyebrows for a current frame and a previous frame of the video sequence, for all the frames in the video sequence.

The steps for VDs computation for each of the video sequence comprise:
 a) Determining, for each of the eyebrows a first highest point of a first eyebrow and a second highest point of a second eyebrow in vertical direction with respect to the identified nose tip coordinates in every frame.
 b) Determining a highest vertical point for each frame by computing statistical mean of the first highest point and the second highest point.
 c) Computing a plurality of VD values by determining the Euclidean distance between the highest vertical point of the current frame and the previous frame of the video sequence, for all the frames in the video sequence;

The steps for HSs computation for each of the video sequence comprise:
 a) Identifying a HD threshold value by computing a statistical mean of the plurality of HD values.
 b) Selecting a first subset of values from the plurality of HD values that are above the horizontal threshold representing a plurality of HS values.
 c) Determining a horizontal count corresponding to number of the plurality of HS values appearing per second.

The steps for VPs computation for each of the video sequence comprise:
 a) Identifying a VD threshold value by computing a statistical mean of the plurality of VD.
 b) Selecting a second subset of values from the plurality of VD values that are above the VD threshold value as a plurality of VP values.
 c) Determining a vertical count corresponding to number of the plurality of VP values appearing per second.

Using Dlib™ packages, multiple coordinates from a single face are captured. Nose tip coordinates are used as reference for further calculation, so that even if the entire face moves, the further calculation of gestures within the face are not impacted. In every frame/image, the start and end of eyebrow co-ordinates are recorded with respect to the nose tip coordinate. The Euclidean distance between the reference points of left eyebrows and right eyebrows has been measured and compared with previous frame value for considering it as key features named as Horizontal displacement (HD). For calculating vertical displacement (VD), the vertical movement of left part and right part of the face has been calculated separately. Left eyebrow and nose tip reference points have been used for calculating the Euclidean distance between them which is nothing but the vertical movement of the left part and vertical movement of the right part has been calculated by measuring the Euclidean distance between right eyebrow and nose tip reference points in the same way. Statistical mean of both the vertical (left & right) movements has been used to calculate the final vertical displacement (VD) features.

Figure 3A:
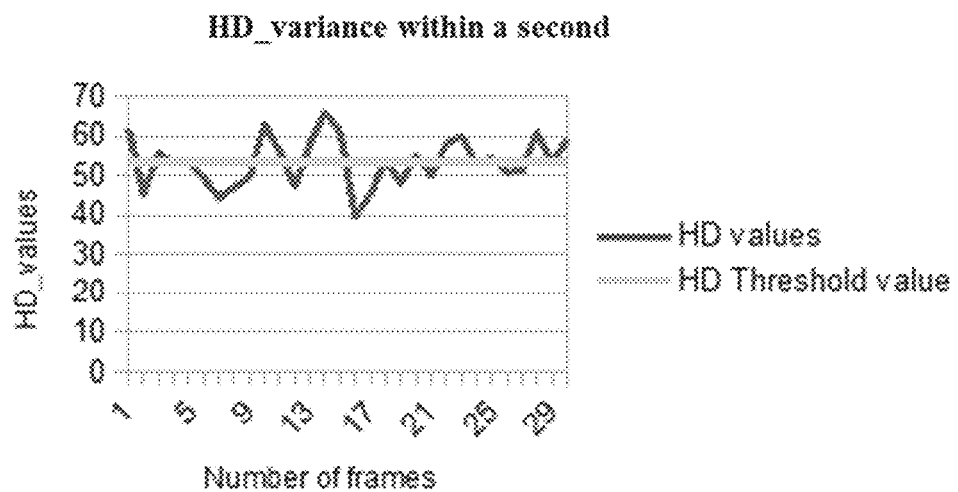
FIGS. 3A and 3B (collectively referred as FIG. 3) are graphical illustrations depicting statistical or time series analysis performed on Horizontal displacements (HDs), Vertical displacements (VDs) features derived from an input face image to determine confidence level of a subject, in accordance with some embodiments of the present disclosure.
Figure 3B:
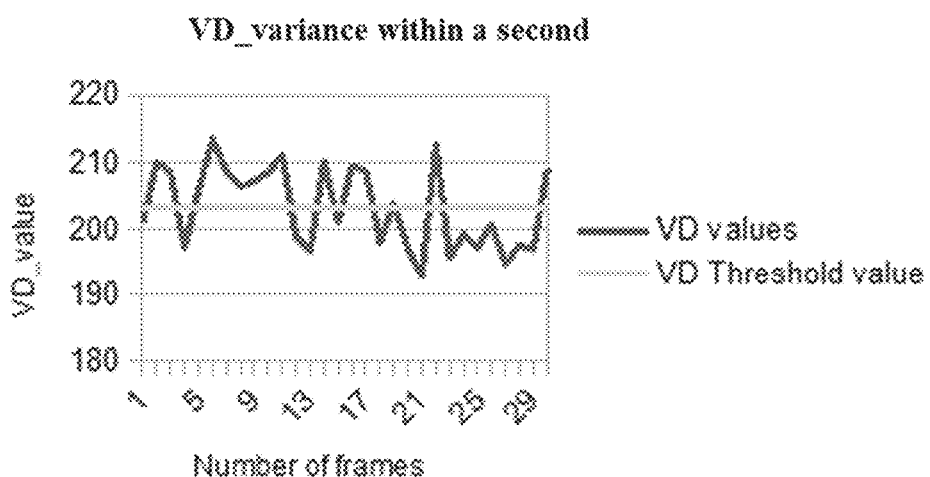

Time series analysis of HDs and VDs to derive HSs and VPs: Before considering the horizontal and vertical displacement value as input features to the neural network architecture, some statistical analysis have been performed on those data. At first, a threshold/reference value has been calculated for HD and VD by using statistical mean with 30 FPS (frames per second) consideration. Vertical peaks and horizontal squeezes are the two features which have been derived thereafter. FIGS. 3A and 3B (collectively referred as FIG. 3) are graphical illustrations depicting statistical or time series analysis performed on Horizontal displacements (HDs), Vertical displacements (VDs) features from among a plurality of face features derived from an input face image to determine confidence level of a subject, in accordance with some embodiments of the present disclosure. The values which deviate from the HD threshold value and the VD threshold value, have been used for further calculation. Basically, the vertical peaks (VPs and horizontal squeezes (HSs) provide the information about the fact, which states that somebody is raising/squeezing the eyebrow than normal. These values are calculated for one second duration and passed as unique features to the NN model. Provided below is a pseudo code for the time series analysis to derive HSs and VPs.

Example Pseudo Code for Example Frame Rate of 30 fps:
 For each of the 30 frames in a second:
 Detect the coordinates of nose, eyes, eyebrows
 Calculate horizontal displacement between eyebrows with nose tip as reference
 Calculate vertical displacement of eyebrows from nose tip
 Calculate HD for consecutive frames
 Calculate VD for consecutive frames
 Calculate mean_HD and mean_VD
 Again, for each of the 30 frames in a second:
 Detect the horizontal squeeze (HS) and vertical peaks (VP)
 Count the number of HS and VPs for this second Both FIGS. 3A and 3B represent the HD_variance and VD_variance within 30 Frames Per Second (FPS). After detecting coordinates of nose, eyes, eyebrows, HD, and VD both have been calculated with consecutive frames. Meanwhile the threshold value for HD and VD has also been calculated using statistical mean. Here from the graph, it is visible how HD and VD both are varying with in one second.

So, every frame is producing a different HD and VD values which are compared with the respective threshold value for that one second. If it is found that there are one or more peaks (HS/VP) which varies from time to time—those will signify that the person is raising/squeezing the eyebrow. From psychology domain, it has been found that the movement of the eyebrow can be a sign of different levels of confidence. Experimental results also showed that with the use of eyebrow features the accuracy of the confidence prediction/confidence classification model has increased considerably. As can be observed in experimental results below.

Figure 4:
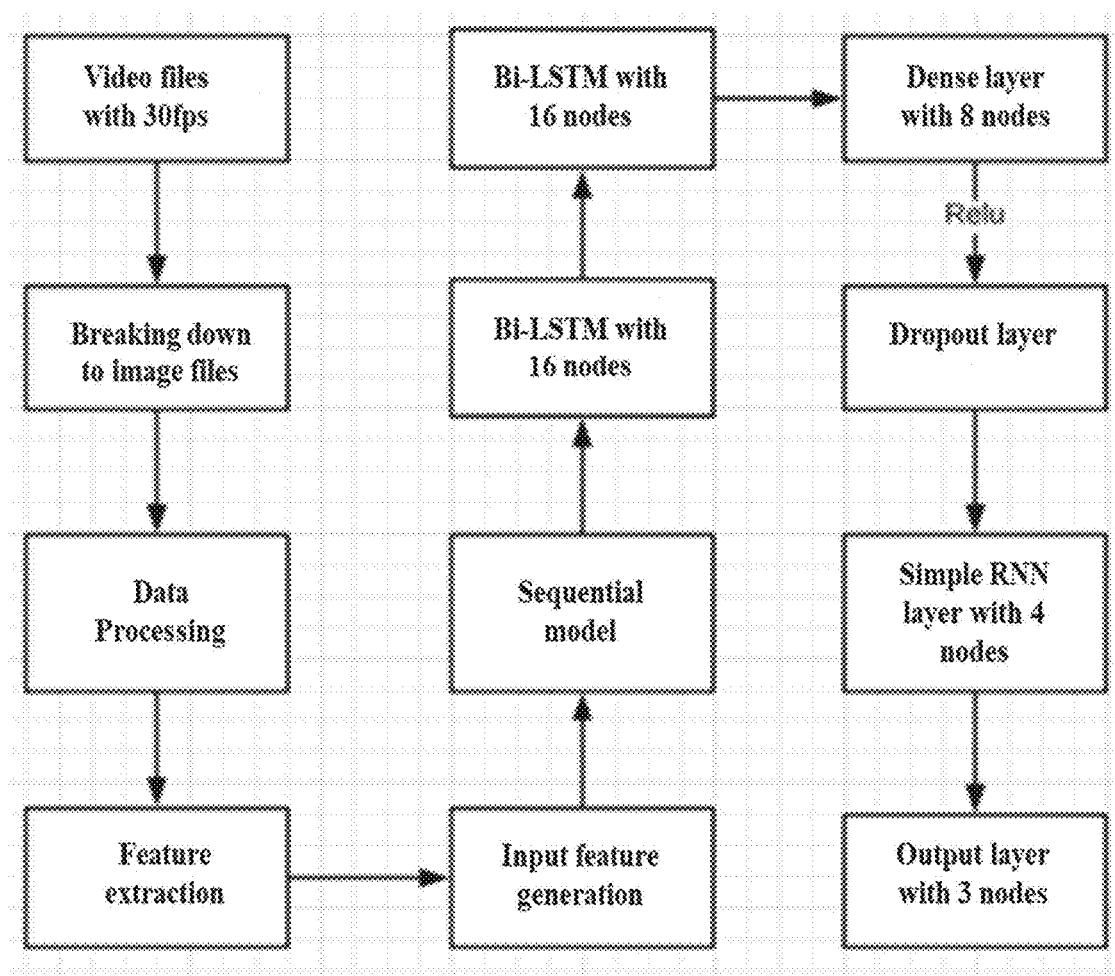
FIG. 4 depicts a functional flow of a Neural Network model used to determine confidence level of the subject in the input image using the plurality of face features based approach, in accordance with some embodiments of the present disclosure.
Figure 5A:
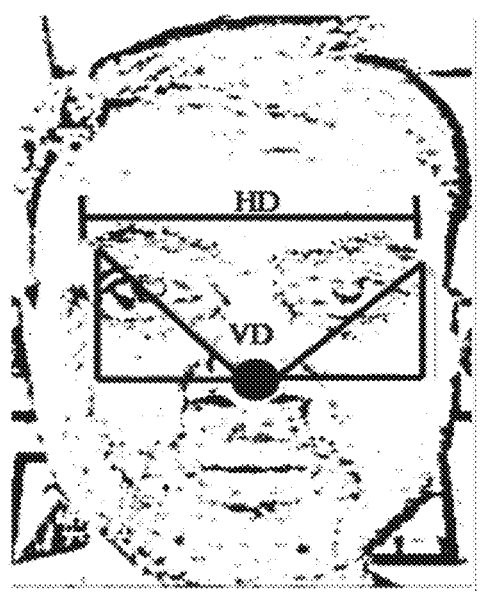
FIG. 5A shows a first schematic representation of input images depicting computation of the eye features for confidence level detection, comprising Horizontal displacements (HDs), Vertical displacements (VDs) using nose tip as reference, in accordance with some embodiments of the present disclosure.
Figure 5B:
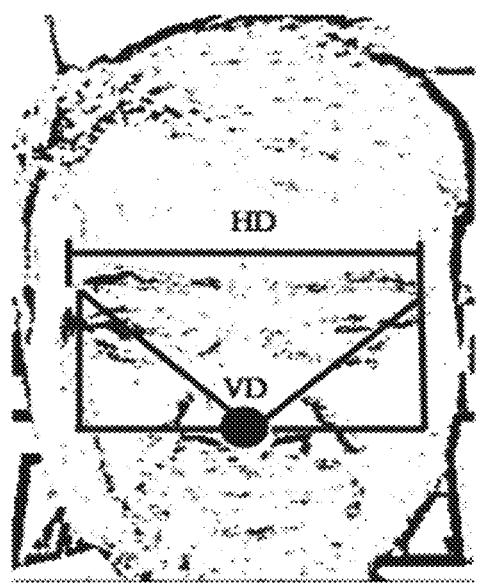
FIG. 5B shows a second schematic representation of input images depicting computation of the eye features for confidence level detection, comprising Horizontal displacements (HDs), Vertical displacements (VDs) using nose tip as reference, in accordance with some embodiments of the present disclosure.
Figure 5C:
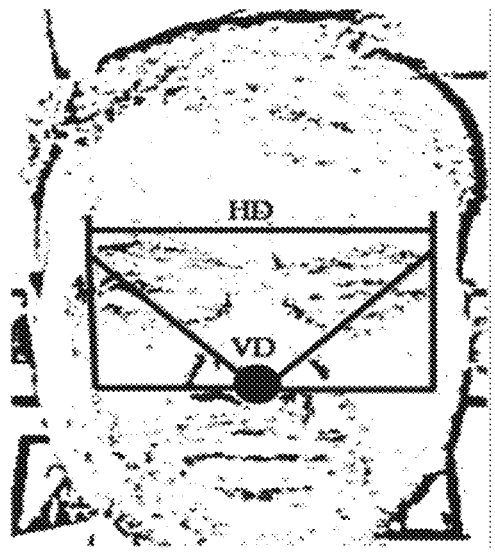
FIG. 5C shows a third schematic representation of input images depicting computation of the eye features for confidence level detection, comprising Horizontal displacements (HDs), Vertical displacements (VDs) using nose tip as reference, in accordance with some embodiments of the present disclosure.
Figure 5D:
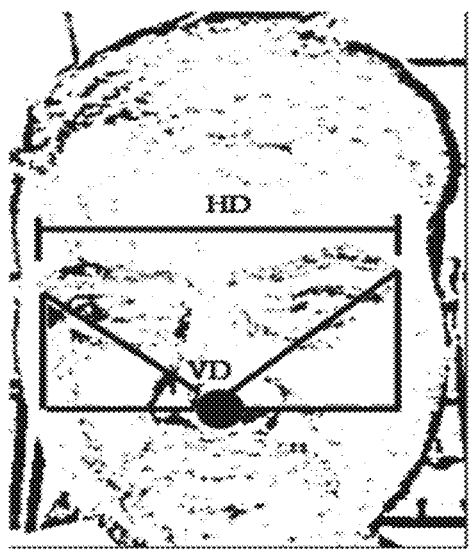
FIG. 5D shows a fourth schematic representation of input images depicting computation of the eye features for confidence level detection, comprising Horizontal displacements (HDs), Vertical displacements (VDs) using nose tip as reference, in accordance with some embodiments of the present disclosure.
Figure 5E:
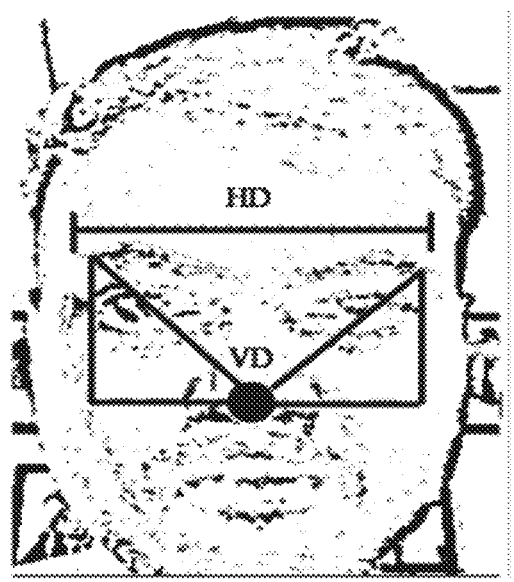
FIG. 5E shows a fifth schematic representation of input images depicting computation of the eye features for confidence level detection, comprising Horizontal displacements (HDs), Vertical displacements (VDs) using nose tip as reference, in accordance with some embodiments of the present disclosure.
Figure 5F:
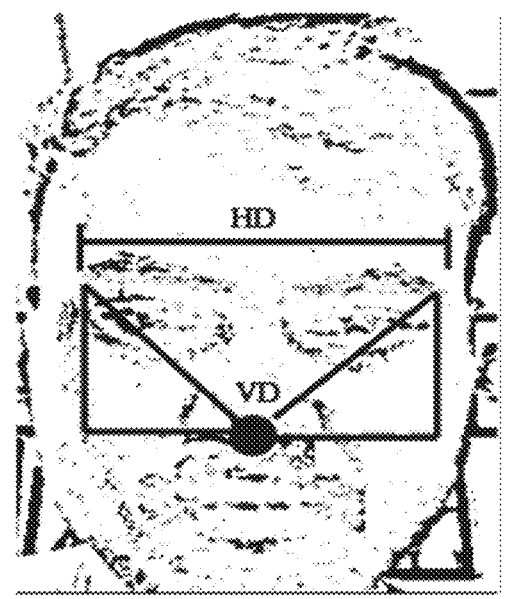
FIG. 5F shows a sixth schematic representation of input images depicting computation of the eye features for confidence level detection, comprising Horizontal displacements (HDs), Vertical displacements (VDs) using nose tip as reference, in accordance with some embodiments of the present disclosure.
Figure 5G:
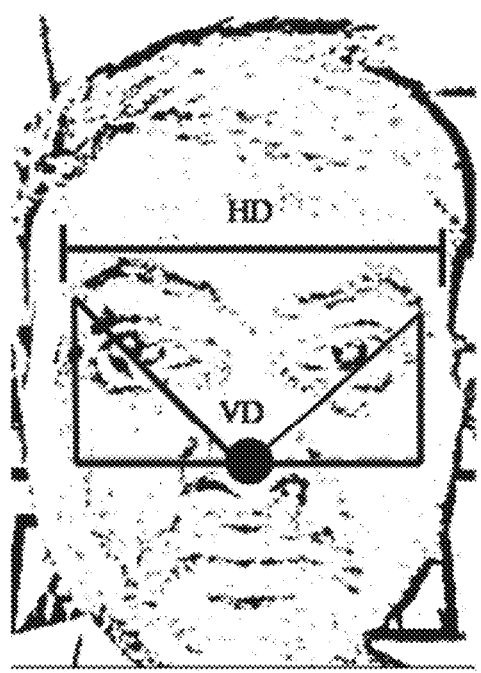
FIG. 5G shows a seventh schematic representation of input images depicting computation of the eye features for confidence level detection, comprising Horizontal displacements (HDs), Vertical displacements (VDs) using nose tip as reference, in accordance with some embodiments of the present disclosure.

Upon deriving the plurality of face features, at step 208 the one or more hardware processors 104 train the Neural network model (NN), using the extracted plurality of face features from the plurality of video sequences to predict a confidence level of the subject into one among a plurality of confidence levels. The confidence levels predicted comprise one of a medium confidence, a high confidence, and a low confidence. FIG. 4 depicts functional flow of the Neural Network model used to determine confidence level of the subject in the input image using the plurality of face features, based approach, in accordance with some embodiments of the present disclosure.

Initial trials for confidence level prediction were done with three models, a) Convolutional Neural Network (CNN) based and b) CNN+LSTM based using raw images as input, and c) the Bi-LSTM based using the facial features disclosed herein, wherein comparative analysis indicated that the Bi-LSTM based NN model performs better. As depicted in FIG. 4, the input data to the Bi-LSTM refers to the extracted plurality of face features for each of the video sequence, wherein the input data comprises a total of 14 385 samples and a timestep of 5, provided to the Bi-LSTM layer with 16 nodes followed by another bi-LSTM layer with 16 nodes, followed by a dense layer with 8 nodes, with ReLU as its activation function, which is followed by a dropout layer, followed by a simple RNN layer with 4 nodes, followed by the final output layer with softmax function. Sparse-categorical-crossentropy is used as the loss function, and an Adam optimizer with a batch size of 48 is chosen.

Once training phase is completed, at step 210, the one or more hardware processors 104 predict confidence level an test subject utilizing the trained NN model by extracting the plurality of face features from the test video sequence captured when the test subject is queried with a set of unknown questions. The unknown question are identified on similar lines of the predefined question to capture maximum variations in facial expressions indicative of variation in confidence level.

FIGS. 5A through 5G (collectively referred as FIG. 5) are schematic representation of input images depicting computation of the eye features for confidence level detection, comprising Horizontal displacements (HDs), Vertical displacements (VDs) using nose tip as reference, in accordance with some embodiments of the present disclosure. The labels to each of the images from 5A through 5G are confidence levels predicted at output of the system 100 based on probability of confidence provided by the NN model by processing the extracted facial features from the respective image.

Experimental results: For the video data or video sequence, three approaches have been implemented for comparison. In the first approach, the CNN model has given an Unweighted Average Recall (UAR) of 45.0% on the test data. With the second approach using LSTM+CNN model, UAR of 67.5% has been achieved. With the third approach, where the features are initially extracted and passed through the Bi-LSTM of FIG. 5, a maximum UAR of 73.6% is achieved. Table 1 shows the confusion matrix for the Bi-LSTM model for video data, which shows the accuracy of three levels in comparison with the ground truth value. Thus, indicates the Bi-LSTM architecture as disclosed in FIG. 5 assisted with the plurality of face features, especially with the eyebrow derived features provides enhanced prediction of the confidence levels. feature based confidence detection application herein.

TABLE 1

Confusion matrix for the Bi-LSTM neural network model

| Acc | High | Low | Med |
|---|---|---|---|
| High | 74.1 | 19.5 | 6.4 |
| Low | 13.5 | 69.8 | 16.7 |
| Med | 12.4 | 10.7 | 76.9 |

TABLE 2

Confusion matrix for the Bi-LSTM neural network model (with and without considering HDND)

| | With HDA/D features | | | Without HDA/D features | | |
|---|---|---|---|---|---|---|
| Acc | High | Low | Med | High | Low | Med |
| High | 74.1 | 19.5 | 6.4 | 55.3 | 36.6 | 11.7 |
| Low | 13.5 | 69.8 | 16.7 | 21.4 | 46.7 | 45.9 |
| Med | 12.4 | 10.7 | 76.9 | 23.3 | 16.7 | 42.4 |

Further, the Bi-LSTM NN model is compared with and without considering HDND, HS, and VP as features. The results are shown in the table format. From table 2, it is quite clear that how these features have changed the accuracy of three levels in comparison with the ground truth value—this performance is indicative or suggestive of significance of considering the above facial features (HD, VD) for human confidence detection.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for confidence level detection, the method comprising:

querying, by one or more hardware processors, a plurality of subjects with a predefined set of questions;

capturing, by the one or more hardware processors, a plurality of video sequences corresponding to the plurality of subjects while the plurality of subjects respond to the predefined set of questions, wherein each video sequence among the plurality of video sequences captures a face of a corresponding subject from the plurality of subjects at predefined frames per second;

extracting, by the one or more hardware processors, a plurality of face features for each of the plurality of video sequences, wherein the plurality of face features comprise an Eye-Aspect ratio—EAR, a mouth movement, Horizontal Displacements—HDs, Vertical Displacements—VDs, Horizontal Squeezes—HSs, and Vertical Peaks—VPs, wherein the HDs computation for each of the video sequence comprises:

identifying nose tip coordinates from the face in every frame of a video sequence among the plurality of video sequences;

identifying eyebrow start coordinates and eyebrow end coordinates for eyebrows of the face in every frame with respect to the nose tip coordinates; and computing a plurality of HD values by determining a Euclidean distance between the eyebrow start coordinates and the eyebrow end coordinates of each of the eyebrows for a current frame and a previous frame of the video sequence, for all the frames in the video sequence;

wherein the VDs computation for each of the video sequence comprises determining for each of the eyebrows, a first highest point of a first eyebrow and a second highest point of a second eyebrow in vertical direction with respect to the identified nose tip coordinates in every frame;

determining a highest vertical point for each frame by computing statistical mean of the first highest point and the second highest point; and computing a plurality of VD values by determining the Euclidean distance between the highest vertical point of the current frame and the previous frame of the video sequence, for all the frames in the video sequence;

wherein the HSs computation for each of the video sequence comprises:

identifying a HD threshold value by computing a statistical mean of the plurality of HD values;

selecting a first subset of values from the plurality of HD values that are above the HD threshold value representing a plurality of HS values; and determining a horizontal count corresponding to number of the plurality of HS values appearing per second;

wherein the VPs computation for each of the video sequence comprises:

identifying a VD threshold value by computing a statistical mean of the plurality of VD;

selecting a second subset of values from the plurality of VD values that are above the VD threshold value as a plurality of VP values; and determining a vertical count corresponding to number of the plurality of VP values appearing per second; and training, by the one or more hardware processors, a Neural network (NN) model, using the extracted plurality of face features from the plurality of video sequences to predict a confidence level of the subject as one among a plurality of confidence levels.

2. The method of claim 1, wherein the method further comprises predicting the confidence level of a test subject utilizing the trained NN model executed by the one or more hardware processors, wherein the trained NN model predicts the confidence level by analyzing extracted face features from a test video sequence captured when the test subject is queried with a set of unknown questions.

3. The method of claim 1, wherein the plurality of confidence levels comprise a low level, a medium level, and a high level.

4. The method of claim 1, wherein architecture of the NN model comprises:
a first Bi-LSTM layer with 16 nodes followed a second Bi-LSTM layer with 16 nodes, followed by a dense layer with 8 nodes, with ReLU as its activation function, which is followed by a dropout layer, further followed by a simple RNN layer with 4 nodes, followed by the final output layer with softmax function, wherein Sparse-categorical-cross-entropy is used as the loss function, and an Adam optimizer with a batch size of 48.

5. A system for confidence level detection, the method comprising, the system comprising:
a memory storing instructions;
one or more Input/Output—I/O interfaces; and
one or more hardware processors coupled to the memory via the one or more I/O interfaces, wherein the one or more hardware processors are configured by the instructions to:
query a plurality of subjects with a predefined set of question;
capture a plurality of video sequences corresponding to the plurality of subjects while the plurality of subjects respond to the predefined set of questions, wherein each video sequence among the plurality of video sequences captures a face of a corresponding subject from the plurality of subjects at predefined frames per second—FPS;
extract a plurality of face features for each of the plurality of video sequences, wherein the plurality of face features comprise an Eye-Aspect Ratio—EAR a mouth movement, Horizontal Displacements—HDs, Vertical Displacements—VDs, Horizontal Squeezes—HSs and Vertical Peaks—VPs
wherein the HDs computation for each of the video sequence comprises:
identifying nose tip coordinates from the face in every frame of a video sequence among the plurality of video sequences;
identifying eyebrow start coordinates and eyebrow end coordinates for eyebrows of the face in every frame with respect to the nose tip coordinates; and
computing a plurality of HD values by determining a Euclidean distance between the eyebrow start coordinates and the eyebrow end coordinates of each of the eyebrows for a current frame and a previous frame of the video sequence, for all the frames in the video sequence;
wherein the VDs computation for each of the video sequence comprises
determining, for each of the eyebrows, a first highest point of a first eywbrow and a second highest point of a second eyebrow in vertical direction with respect to the identified nose tip coordinates in every frame;
determining a highest vertical point for each frame by computing statistical mean of the first highest point and the second highest point; and
computing a plurality of VD values by determining the Euclidean distance between the highest vertical point of the current frame and the previous frame of the video sequence, for all the frames in the video sequence;
wherein the HSs computation for each of the video sequence comprises:
identifying a HD threshold value by computing a statistical mean of the plurality of HD values;
selecting a first subset of values from the plurality of HD values that are above the HD threshold value representing a plurality of HS values; and
determining a horizontal count corresponding to number of the plurality of HS values appearing per second;
wherein the VPs computation for each of the video sequence comprises:
identifying a VD threshold value by computing a statistical mean of the plurality of VD;
selecting a second subset of values from the plurality of VD values that are above the VD threshold value as a plurality of VP values; and
determining a vertical count corresponding to number of the plurality of VP values appearing per second; and
train a Neural Network—NN model, using the extracted plurality of face features from the plurality of video sequences to predict a confidence level of the subject as one among a plurality of confidence levels.

6. The system of claim 5, wherein the one or more hardware processors are further configured to predict the confidence level of an test subject utilizing the trained NN model executed by the one or more hardware processors, wherein the trained NN model predicts the confidence level by analyzing extracted face features from the test video sequence captured when the test subject is queried with a set of unknown questions.

7. The system of claim 5, wherein the plurality of confidence levels comprise a low level, a medium level, and a high level.

8. The system of claim 5, wherein architecture of the NN model comprises:
a first Bi-LSTM layer with 16 nodes followed a second Bi-LSTM layer with 16 nodes, followed by a dense layer with 8 nodes, with ReLU as its activation function, which is followed by a dropout layer, further followed by a simple RNN layer with 4 nodes, followed by the final output layer with softmax function, wherein Sparse-categorical-cross-entropy is used as the loss function, and an Adam optimizer with a batch size of 48.

9. One or more non-transitory machine-readable information storage mediums comprising one or more instructions, which when executed by one or more hardware processors causes a method for confidence level detection, the method comprising:
querying a plurality of subjects with a predefined set of questions;
capturing a plurality of video sequences corresponding to the plurality of subjects while the plurality of subjects respond to the predefined set of questions, wherein each video sequence among the plurality of video sequences captures a face of a corresponding subject from the plurality of subjects at predefined frames per second—FPS;
extracting a plurality of face features for each of the plurality of video sequences, wherein the plurality of face features comprise an Eye-Aspect Ratio—EAR, a mouth movement, Horizontal Displacements—HD Vertical Displacements—VDs, Horizontal Squeezes—HSs and Vertical Peaks—VPs wherein the HDs computation for each of the video sequence comprises:

identifying nose tip coordinates from the face in every frame of a video sequence among the plurality of video sequences;

identifying eyebrow start coordinates and eyebrow end coordinates for eyebrows of the face in every frame with respect to the nose tip coordinates; and computing a plurality of HD values by determining a Euclidean distance between the eyebrow start coordinates and the eyebrow end coordinates of each of the eyebrows for a current frame and a previous frame of the video sequence, for all the frames in the video sequence;

wherein the VDs computation for each of the video sequence comprises determining for each of the eyebrows, a first highest point of a first eyebrow and a second highest point of a second eyebrow in vertical direction with respect to the identified nose tip coordinates in every frame;

determining a highest vertical point for each frame by computing statistical mean of the first highest point and the second highest point; and computing a plurality of VD values by determining the Euclidean distance between the highest vertical point of the current frame and the previous frame of the video sequence, for all the frames in the video sequence;

wherein the HSs computation for each of the video sequence comprises:

identifying a HD threshold value by computing a statistical mean of the plurality of HD values;

selecting a first subset of values from the plurality of HD values that are above the HD threshold value representing a plurality of HS values; and determining a horizontal count corresponding to number of the plurality of HS values appearing per second;

wherein the VPs computation for each of the video sequence comprises:

identifying a VD threshold value by computing a statistical mean of the plurality of VD;

selecting a second subset of values from the plurality of VD values that are above the VD threshold value as a plurality of VP values; and determining a vertical count corresponding to number of the plurality of VP values appearing per second; and training a Neural Network—NN model, using the extracted plurality of face features from the plurality of video sequences to predict a confidence level of the subject as one among a plurality of confidence levels.

10. The one or more non-transitory machine-readable information storage mediums of claim 9, further comprising predicting the confidence level of a test subject utilizing the trained NN model executed by the one or more hardware processors, wherein the trained NN model predicts the confidence level by analyzing extracted face features from a test video sequence captured when the test subject is queried with a set of unknown questions.

11. The one or more non-transitory machine-readable information storage mediums of claim 9, wherein the plurality of confidence levels comprise a low level, a medium level, and a high level.

12. The one or more non-transitory machine-readable information storage mediums of claim 9, wherein architecture of the NN model comprises:

a first Bi-LSTM layer with 16 nodes followed a second Bi-LSTM layer with 16 nodes, followed by a dense layer with 8 nodes, with ReLU as its activation function, which is followed by a dropout layer, further followed by a simple RNN layer with 4 nodes, followed by the final output layer with softmax function, wherein Sparse-categorical-cross-entropy is used as the loss function, and an Adam optimizer with a batch size of 48.

* * * * *